United States Patent [19]

Kirilloff

[11] 4,048,664
[45] Sept. 13, 1977

[54] PROTECTIVE CIRCUIT FOR DYNAMIC BRAKING RESISTORS

[75] Inventor: Victor V. Kirilloff, Murrysville, Pa.

[73] Assignee: Mosebach Manufacturing Company, Pittsburgh, Pa.

[21] Appl. No.: 703,896

[22] Filed: July 9, 1976

[51] Int. Cl.² .............................................. H02H 3/04
[52] U.S. Cl. ..................................... 361/89; 361/103; 338/53
[58] Field of Search ...................... 361/31, 86, 89, 103; 318/375, 380, 376; 317/40 R; 338/53; 188/158, 159, 264 R

[56] References Cited

U.S. PATENT DOCUMENTS

| 3,885,200 | 5/1975 | Burkle | 361/103 |
| 3,898,532 | 8/1975 | Frank | 361/86 X |

*Primary Examiner*—Harry E. Moose, Jr.
*Attorney, Agent, or Firm*—Buell, Blenko & Ziesenheim

[57] ABSTRACT

A circuit for protecting a pair of dynamic brake resistors when either of two motors driving fans for cooling the resistors fails. A sensing circuit couples the terminal of the two motors to a switch circuit. The sensing circuit reduces the energy to the switch circuit which removes power to the resistors when the sensing circuit senses a failure in one of the motors.

6 Claims, 2 Drawing Figures

PROTECTIVE CIRCUIT FOR DYNAMIC BRAKING RESISTORS

STATEMEMT OF THE PROBLEM

Locomotives use resistors in a grid configuration for the purpose of dynamic braking of the locomotive. The resistors are in series. The amount of current that passes through the grid resistors is approximately 700 amperes. Fans are used to cool the resistors and prolong their life and prevent overheating and destruction of the resistor which would cause loss of dynamic braking. On locomotives that have an SD designation there are two fans that are used to cool locomotive brake grids. The fans are driven by two motors which take their power from the current in the resistors. There is a need to sense the loss of the cooling fans to avoid resistor damage.

PRIOR ART

The prior art used a switching technique that detected a stalled fan which presented a low impedance. The circuitry burned out because the switching circuit was incapable of handling 700 amperes. My invention solves this problem by sampling a very small amount of energy which is used in a control circuit to regulate the power to traction motors which removes power to the dynamic brakes. It opens a contactor which removes the dynamic brakes.

I provide a circuit for protecting a pair of dynamic brake resistors when either of two motors driving fans for cooling the resistors fails, comprising a sensing circuit means having an input coupled to terminals of each of the motors, the sensing means has an output, the sensing means substantially reduces the electrical energy from the input to the output; and a switch means coupled to the output of the sensing circuit means, the switch means removes power to the dynamic brake resistors when the output from the sensing circuit reaches a certain level thereby protecting the resistors from overheating when there is a failure of either motor driving the cooling fans.

DESCRIPTION OF THE CIRCUIT AND OPERATION

Figure 1:
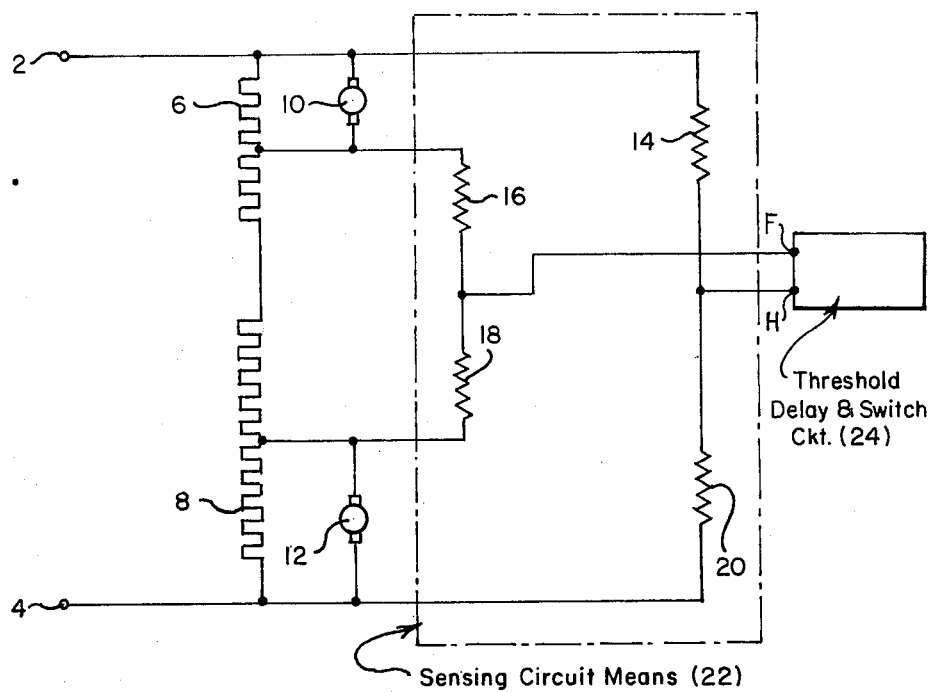
FIG. 1 is a schematic diagram of the sensing circuit.

Sensing Circuit Means (22, FIG. 1)

Terminals 2 and 4 are coupled to traction motors (not shown) of the locomotive. Terminal 2, during its normal operation has approximately 700 amperes of current in maximum dynamic braking which is coupled through dynamic braking resistors 6 and 8. Fan motors 10 and 12 provide the cooling for the grid resistors 6 and 8 used in the dynamic braking. In the event that there is a failure of one of the fans or its motors 10 or 12 this condition must be detected immediately assuming a reasonable time delay for start up operation of the motors. Otherwise, the grid resistors 6 or 8 will burn. When there is a malfunction of the motors (or fans) 10 and 12 a high current is present at the terminals of the affected motor. A sensing circuit means 22 provides a signal at terminals H and F. The sensing circuit means 22 is the equivalent of an open bridge and is in the form of an H circuit formed by resistors 16, 18 and 20. When one of the motors malfunctions there is an imbalance in the bridge circuit and high current (approx. 700 amperes) will flow to the input of the sensing circuit means. The sensing means 22 substantially reduces the electrical energy from the input at the motors (10 and 12) terminals to the output at terminals H and F.

Figure 2:
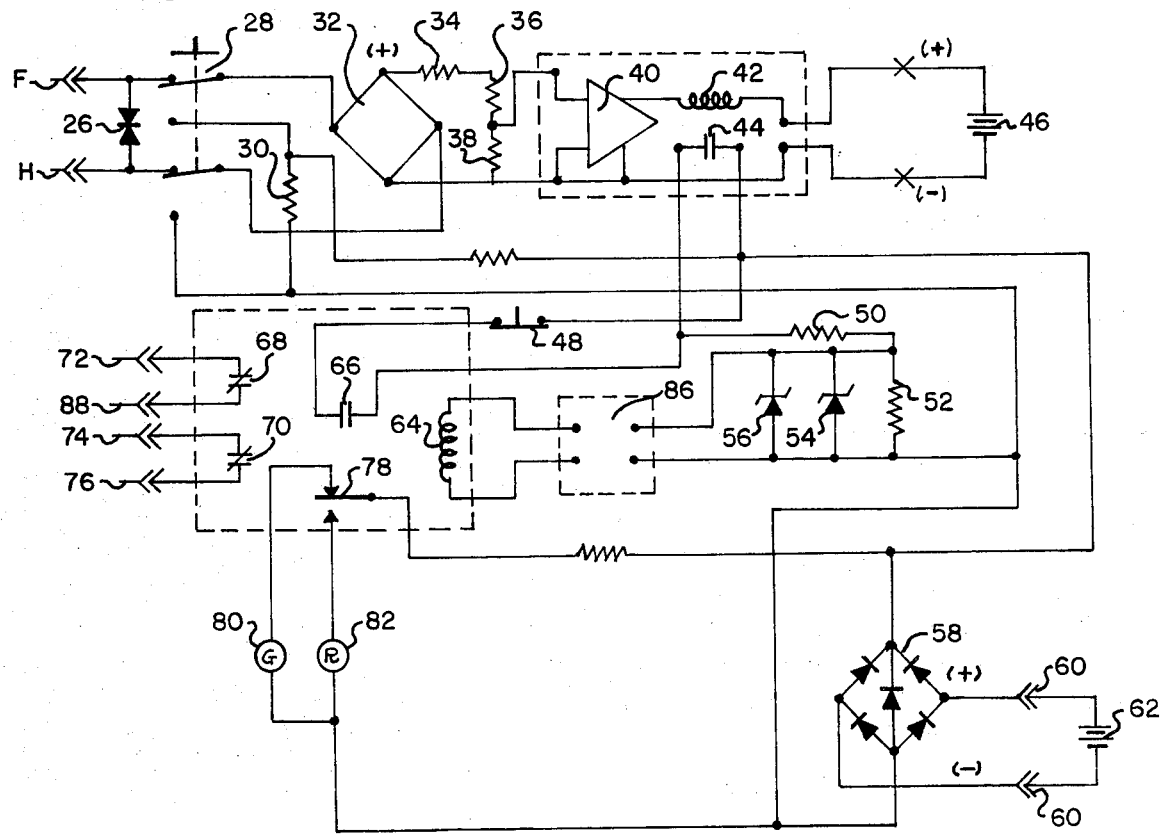
FIG. 2 is a schematic diagram of switching and threshold delay circuit.

Switch Means (24, FIG. 2)

The energy at terminals H and F (or the voltage) is coupled to a threshold delay and switch circuit generally referred to as 24. The circuit is shown in FIG. 2. In operation when one of the motors or fans 10 or 12 malfunctions because of snow clogging the fan in the locomotive, a low impedance lower than normal operation will be presented across the motor 10 and 12 and this will result in a higher voltage than normal across the terminal H and F. This voltage is then picked up by the threshold delay and switch circuit 24. The threshold delay and switch circuit 24 referred to in FIG. 2 comprises a pair of coupling terminals H and F which are coupled to the sensing circuit means 22 at corresponding terminals H and F. A pair of diodes 26 acting as a spark gap is coupled across terminal F and H to avoid passing a spark current through the rest of the circuit. The pair of diodes 26 act as a short. The shorted condition is only present during a high spark of current. A test switch 28 is coupled to the diode terminal 26. The purpose of the test switch is to test the operation of batteries 46 and 62 in the circuit to determine their operational levels. A resistor 30 is coupled with the test switch 28 to prevent damage during the testing of bridge circuit 58. A standard bridge circuit 32 is coupled to the switch 28. A resistor 34 drops the output voltage from the bridge circuit. The output voltage from resistor 34 is then coupled to a voltage divider comprising resistors 36 and 38. The amplifier circuit 40 takes its input signal from the voltage divider network of resistor 36 and 38. The level of the voltage divider network resistor 36 and resistor 38 determines the threshold of conductivity of the amplifier 40. When the input signal to the amplifier 40 from the voltage divider network is above the desired threshold value, the amplifier 40 will conduct and place coil 42 in the circuit powered by battery 46. The coil 42 closes a pair of contacts 44 which are isolated from the coil 42. This will place the battery 62 which is coupled through terminals 60 to bridge circuit 58. This supplies energy (voltage and current) to the voltage divider network comprising resistors 50 and 52. The output from the voltage divider network 50 and 52 is coupled to terminals of a time delay circuit 86. Sensor diodes 56 and 54 prevent damage to the time delay circuit 86 due to surges or voltages in excess of a rating on the time delay circuit 86 input. The time delay circuit 86 is normally set for ten seconds but can be varied depending upon locomotive characteristics. The purpose of the time delay circuit is to avoid nuisance trips of the circuit due to a lag in starting speeds and times of the fan motors 10 and 12 due to lack of normal characteristics in the motors 10 and 12. If the condition continues to exist for a period in excess of the desired calibrated time (normally ten seconds) coil 64 will energize and close contact 66 which latches switch 78 and places light indicator 82 in the circuit and indicates a trip condition by the stalling of either of the motors 10 and 12. Light indicator 80 is normally on when contact 66 is not latched. Also when coil 64 is energized due to a trip condition existing by failure of one of the motors 10 and 12, contacts 68 and 70 are opened. These contacts couple the circuit at terminals 72, 74, 76 and 88 to the locomotive dynamic brake control circuitry which transfers and removes the dynamic brake of the locomotive and removes the power from the dynamic brake grid resistors and protects them from burning out. Once the trip function has taken place the circuit can be reset back to the non-trip state by depressing switch 48. Should a fault condition still exist the trip circuitry is activated. Should a fault condition not exist it will return to the normal state.

I claim:

1. A circuit for protecting a pair of dynamic brake resistors when either of two motors driving fans for cooling the resistors fails, comprising:
   a. a sensing circuit means having an input coupled to terminals of each of the motors and an output coupled to the input through voltage dropping impedances so as to substantially reduce the electrical energy from the input to the output; and
   b. a switch means coupled to the output of the sensing circuit means, the switch means removes power to the dynamic brake resistors when the output from the sensing circuit reaches a certain level thereby protecting the resistors from overheating when there is a failure of either motor driving the cooling fans.

2. A circuit as recited in claim 1 wherein the sensing circuit means comprises a resistor bridge circuit which provides a substantially low output voltage compared to the input voltage.

3. A circuit as recited in claim 1 wherein the switch means comprises:
   a. a bridge circuit coupled to the output of the sensing circuit means;
   b. a voltage divider network coupled to an output of the bridge circuit;
   c. a switching means having an input coupled to the voltage divider circuit;
   d. a coil coupled to one output of the switching means;
   e. a first source of power coupled to the coil and to another output of the switching means;
   f. a first contact switch which is closed depending upon the field at the coil;
   g. a second source of power coupled to the contact switch;
   h. a time delay circuit coupled to the second source of power;
   i. a second coil coupled to an output of the time delay circuit; and
   j. a second contact switch means which is controlled by the second coil, the second contact switch means removes power to the resistors when the coil is energized thereby protecting the resistors from overheating.

4. A circuit as recited in claim 3 including an indicator means circuit coupled electromagnetically to the second coil and indicating the presence of a high voltage at the input to the sensing circuit means.

5. A circuit as recited in claim 4 wherein the switching means coupled to the voltage divider circuit is an amplifier circuit.

6. A circuit as recited in claim 5 wherein the sensing circuit means comprises a resistor bridge circuit which provides a substantially low output voltage compared to the input voltage.

* * * * *